US010455320B2

(12) United States Patent
Ralph

(10) Patent No.: US 10,455,320 B2
(45) Date of Patent: Oct. 22, 2019

(54) SYSTEM, METHOD AND APPARATUS FOR TRANSLATING, CONVERTING AND/OR TRANSFORMING AUDIO ENERGY INTO HAPTIC AND/OR VISUAL REPRESENTATION

(71) Applicant: Brandon Ralph, New York, NY (US)

(72) Inventor: Brandon Ralph, New York, NY (US)

(73) Assignee: Body Beats, LLC, Wilmington, DE (US)

( * ) Notice: Subject to any disclaimer, the term of this patent is extended or adjusted under 35 U.S.C. 154(b) by 0 days.

(21) Appl. No.: 16/051,073

(22) Filed: Jul. 31, 2018

(65) Prior Publication Data

US 2019/0045296 A1    Feb. 7, 2019

Related U.S. Application Data

(60) Provisional application No. 62/540,187, filed on Aug. 2, 2017.

(51) Int. Cl.
| | | |
|---|---|---|
| *H04R 3/00* | (2006.01) | |
| *H04R 1/22* | (2006.01) | |
| *H04R 1/28* | (2006.01) | |
| *G02F 1/01* | (2006.01) | |
| *H04R 1/04* | (2006.01) | |
| *G06F 3/01* | (2006.01) | |
| *B06B 1/06* | (2006.01) | |
| *G06F 1/16* | (2006.01) | |
| *B06B 1/04* | (2006.01) | |

(52) U.S. Cl.
CPC ............... *H04R 1/222* (2013.01); *B06B 1/06* (2013.01); *G02F 1/0121* (2013.01); *G06F 3/016* (2013.01); *H04R 1/04* (2013.01); *H04R 1/2807* (2013.01); *H04R 3/00* (2013.01); *B06B 1/04* (2013.01); *G06F 1/163* (2013.01)

(58) Field of Classification Search
CPC ........ H04R 1/222; H04R 1/04; H04R 1/2807; H04R 3/00; B06B 1/06; B06B 1/04; G02F 1/0121; G06F 3/016; G06F 1/163
USPC .......... 381/122, 56–57, 61–62, 333–334, 91, 381/151, 162, 365, 364, 385, 388
See application file for complete search history.

(56) References Cited

U.S. PATENT DOCUMENTS

| | | |
|---|---|---|
| 3,838,417 A | 9/1974 | Charas |
| 4,359,669 A | 11/1982 | Anderson |
| 4,389,598 A | 6/1983 | Smith |
| RE32,341 E | 1/1987 | Smith |
| 5,083,064 A | 1/1992 | Jones |

(Continued)

OTHER PUBLICATIONS

Basslet—The watch-size wubwoofer for your body—Lofelt, downloaded at https://us.lofelt.com/products/basslet, Jun. 17, 2018 (14 pages).

*Primary Examiner* — Norman Yu
(74) *Attorney, Agent, or Firm* — Benesch, Friedlander, Coplan & Aronoff LLP

(57) ABSTRACT

A device can be worn by a user and can include a microphone to analyze music and other sound in the surrounding environment. In one embodiment, the device can translate audio into a haptic and/or light of the sound's or music's bassline, in real-time. In one embodiment, no music is recorded by the device. The haptic or vibrational representation of the music can be generated by a motor. In some examples, the light representation of the music can be generated via a red/green/blue light emitting diode.

20 Claims, 15 Drawing Sheets

(56) References Cited

U.S. PATENT DOCUMENTS

| | | |
|---|---|---|
| 5,111,113 A | 5/1992 | Chu |
| 5,121,435 A | 6/1992 | Chen |
| 5,402,702 A | 4/1995 | Hata |
| 5,471,373 A | 11/1995 | Coleman et al. |
| 5,501,131 A | 3/1996 | Hata |
| 5,567,892 A | 10/1996 | Huang |
| 6,410,835 B2 | 6/2002 | Suzuki et al. |
| 7,319,762 B2 | 1/2008 | Andrea et al. |
| 7,449,356 B2 | 11/2008 | Weigold |
| 7,453,039 B2 | 11/2008 | Ramstein |
| 7,659,473 B2 | 2/2010 | Ramstein |
| 7,825,484 B2 | 11/2010 | Martin |
| 7,839,269 B2 | 11/2010 | Steger et al. |
| 7,885,423 B2 | 2/2011 | Weigold |
| 7,961,897 B2 | 6/2011 | Weigold |
| 7,993,042 B2 | 8/2011 | Padilla |
| 8,007,043 B1 | 8/2011 | Vuong |
| 8,059,105 B2 | 11/2011 | Rosenberg |
| 8,093,995 B2 | 1/2012 | Steger et al. |
| 8,133,440 B2 | 3/2012 | Jorgensen |
| 8,351,299 B2 | 1/2013 | Cohen |
| 8,378,795 B2 | 2/2013 | Steger et al. |
| 8,638,301 B2 | 1/2014 | Birnbaum |
| 8,767,996 B1 | 7/2014 | Lin et al. |
| 8,919,982 B2 | 12/2014 | Pulido, Jr. |
| 8,952,629 B2 | 2/2015 | Griffiths et al. |
| 8,977,376 B1 | 3/2015 | Lin et al. |
| 9,119,264 B2 | 8/2015 | Pulido, Jr. |
| 9,390,630 B2 | 7/2016 | Daniels |
| 9,453,627 B1 | 9/2016 | Chen |
| 9,475,426 B1 | 10/2016 | Bobo et al. |
| 9,505,344 B1 | 11/2016 | Bobo et al. |
| 9,522,343 B2 | 12/2016 | Liu et al. |
| 9,640,047 B2 | 5/2017 | Choi et al. |
| 9,679,546 B2 | 6/2017 | Ebeling et al. |
| 9,729,985 B2 | 8/2017 | Lin et al. |
| 9,785,236 B2 | 10/2017 | Afshar |
| 9,786,201 B2 | 10/2017 | Ebeling et al. |
| 9,998,820 B2 | 6/2018 | Bearden |
| 10,021,487 B2 | 7/2018 | Yan et al. |
| 2004/0175014 A1 | 9/2004 | Liu |
| 2005/0079852 A1 | 4/2005 | Tseng |
| 2007/0091738 A1 | 4/2007 | Liu et al. |
| 2009/0189748 A1 | 7/2009 | Bergere |
| 2012/0247990 A1 | 10/2012 | Hsiao |
| 2014/0191687 A1 | 7/2014 | Xiang |
| 2014/0320030 A1 | 10/2014 | Chiang |
| 2015/0063606 A1 | 3/2015 | Alexiou |
| 2015/0071456 A1 | 3/2015 | Steenkamp |
| 2015/0110279 A1* | 4/2015 | Tejerina ............ G01H 3/14 381/56 |
| 2015/0124991 A1 | 5/2015 | Hwan et al. |
| 2015/0195663 A1 | 7/2015 | Lin et al. |
| 2016/0203685 A1* | 7/2016 | Schwartz ........... G09B 21/003 340/407.1 |
| 2016/0364960 A1 | 12/2016 | Cheatham, III et al. |
| 2017/0027271 A1 | 2/2017 | Ferencz |
| 2017/0098350 A1 | 4/2017 | Ebeling et al. |
| 2017/0255351 A1 | 9/2017 | Whang |
| 2017/0332162 A1 | 11/2017 | Lin et al. |
| 2017/0337033 A1 | 11/2017 | Duyan et al. |
| 2018/0033263 A1 | 2/2018 | Novich et al. |
| 2018/0078422 A1* | 3/2018 | Dierenbach .......... A61F 11/045 |
| 2018/0108456 A1 | 4/2018 | Yin et al. |
| 2018/0152786 A1 | 5/2018 | Moeller et al. |

* cited by examiner

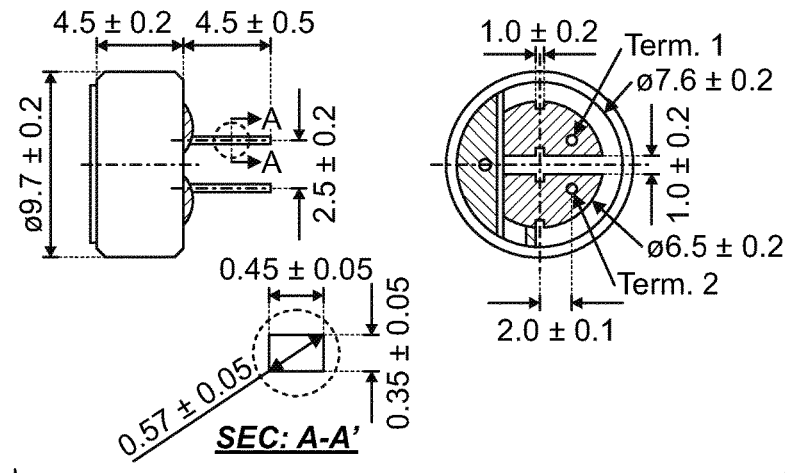
FIG. 15
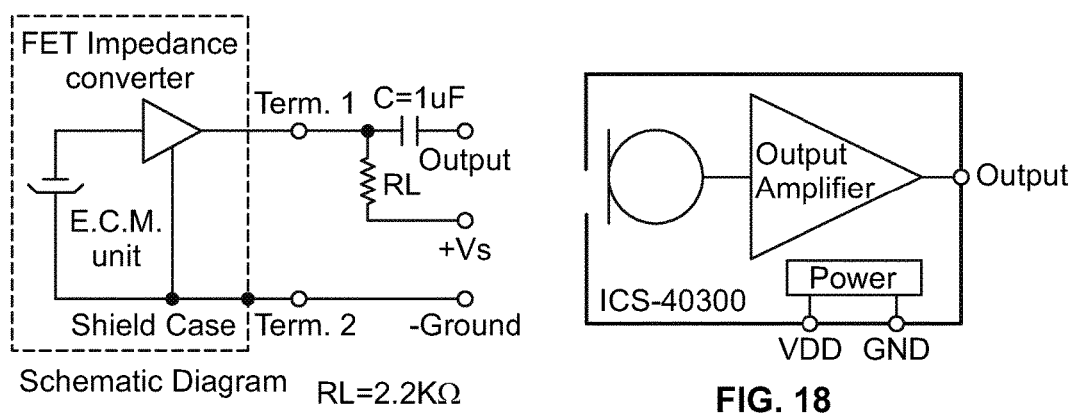
FIG. 16
FIG. 18
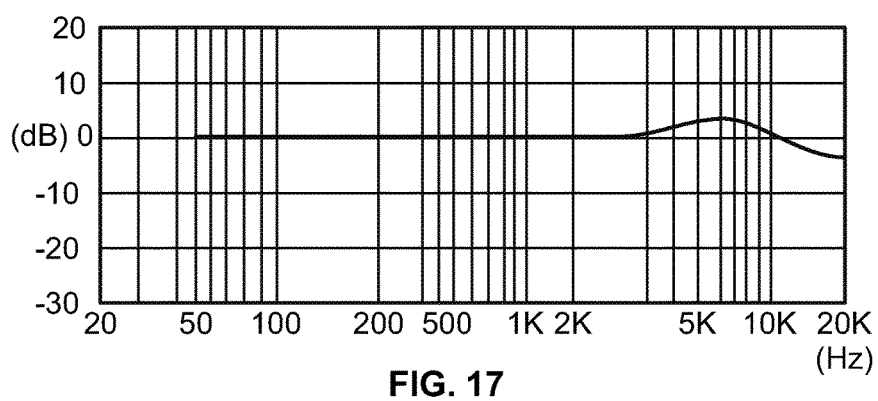
FIG. 17

SYSTEM, METHOD AND APPARATUS FOR TRANSLATING, CONVERTING AND/OR TRANSFORMING AUDIO ENERGY INTO HAPTIC AND/OR VISUAL REPRESENTATION

CROSS-REFERENCE TO RELATED APPLICATION

This application claims the benefit of U.S. Provisional Application Ser. No. 62/540,187, filed Aug. 2, 2017, which is incorporated in its entirety herein.

BACKGROUND

Some wearable items respond or react to sounds or music. For example, SUBPAC has produced a vest that includes a subwoofer that takes either a line-in or Bluetooth signal from an audio source to produce a physical response from the vest. The driver in this vest is the subwoofer. This technology is represented, at least in part, by U.S. Publication No. 2015/0063606, which is hereby incorporated by reference in its entirety. Another example is the BASSLET by LOFELT. The BASSLET is a bracelet that vibrates with the bass received via a Bluetooth signal. Further examples of prior art haptic technology are described in U.S. Pat. Nos. 8,351,299, 8,059,105 and 8,638,301, which are each hereby incorporated by reference in their entirety.

BRIEF SUMMARY

In one embodiment, the presently disclosed technology is directed to a device that uses a microphone to analyze music and other sound in the surrounding environment. Such a device can be configured to translate the audio into haptic and/or visual (e.g., light) representation(s) of music's bassline in real-time. In addition to or alternatively to representing music's bassline, the device can be configured to represent music's treble (e.g., "high hat" lines) and/or midranges, for example. In one embodiment, no music is recorded by the device. The haptic and/or vibrational representation of the music can be generated in any of a variety of ways, such as by one or more haptic eccentric rotating mass (ERM) motors and/or haptic motors (e.g., a linear haptic motors or a piezo haptic motor). The light representation of the music can be generated via at least one red, blue and green (RGB) light-emitting diode (LED).

In another embodiment, the presently disclosed technology uses a microphone as the input, analyzes live audio from the surrounding environment, and/or combines light response with vibrational response. The device of the presently disclosed technology employs this technology and provides functionality not taught by the prior art.

The summary is provided merely for purposes of summarizing some example embodiments so as to provide a basic understanding of some aspects of the disclosure. Accordingly, it will be appreciated that the above described examples should not be construed to narrow the scope or spirit of the disclosure in any way. Other examples, embodiments, aspects, and advantages will become apparent from the following detailed description taken in conjunction with the accompanying drawings.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown.

FIG. 15 depicts the appearance of an exemplary microphone that may be used as part of an exemplary embodiment of the presently disclosed technology;

FIG. 16 depicts a measurement circuit of an exemplary microphone shown in relation to FIG. 15;

FIG. 17 depicts a frequency response curve of the exemplary microphone shown in relation to FIG. 15;

FIG. 18 shows a functional block diagram of another exemplary microphone that may be used as part of an exemplary embodiment of the presently disclosed technology;

DETAILED DESCRIPTION

Figure 1:
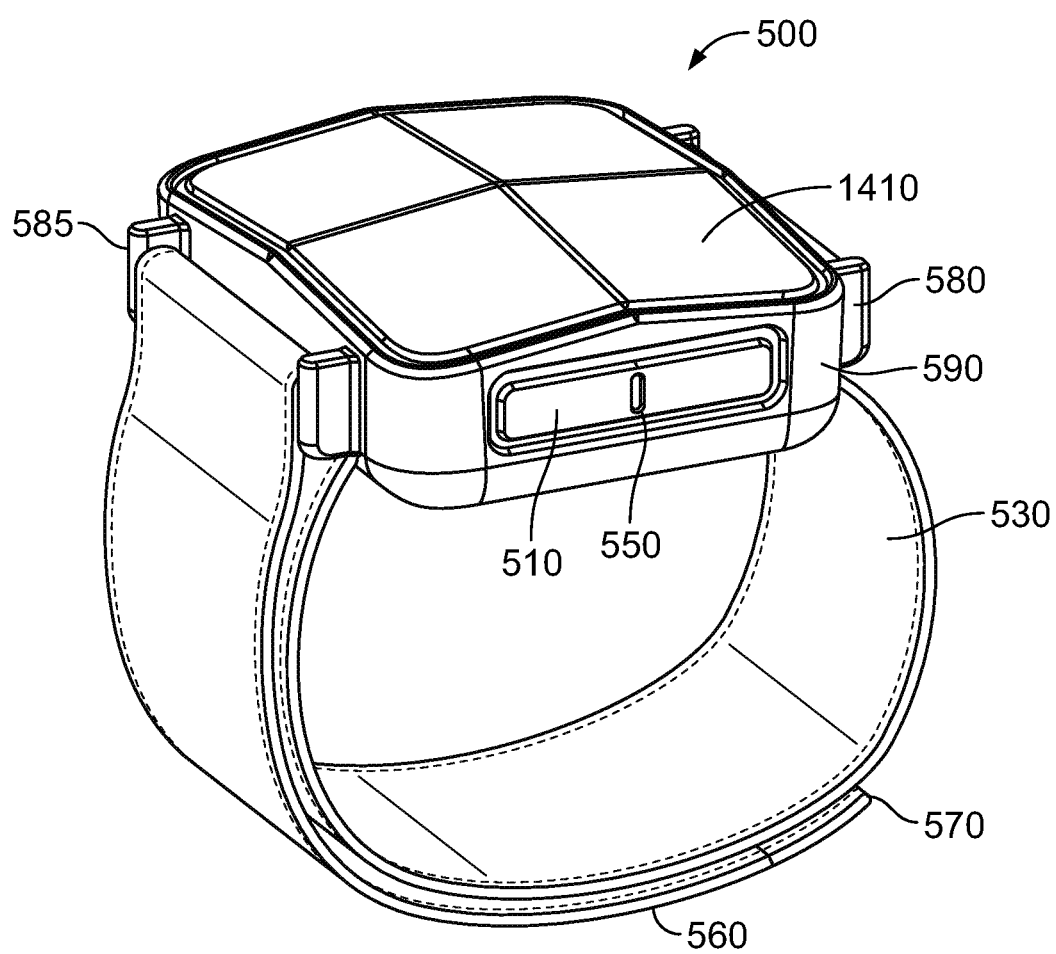
FIG. 1 is a perspective view of a device in accordance with one embodiment of the presently disclosed technology.

Certain terminology is used in the following description for convenience only and is not limiting. The words "bottom," "top," "left," "right," "lower" and "upper" designate directions in the drawings to which reference is made. Unless specifically set forth herein, the terms "a," "an" and "the" are not limited to one element but instead should be read as meaning "at least one." The terminology includes the words noted above, derivatives thereof and words of similar import.

FIG. 1 shows an example of the device 500 with a body 590 and a strap 530 of the device 500. In one embodiment, the device 500 includes at least one input device, e.g., a microphone, configured to receive music and/or other sound or noise in environment surroundings or near the device 500. As described in more detail below, the device 500 can include one or more processors that analyze the sound to control one or more output devices, e.g., one or more haptic and/or visual output devices. For example, the device 500 can include a lens 1410 for covering LEDs and/or other light sources. The device 500 can include a strap 530 to be a wrist-worn device, such as a watch or bracelet, but the device is not so limited and can be in other forms (e.g., clothing, belts, hats, mobile phone cases, headphones, computer or stereo equipment, decorative items, and the like). In other words, instead of being wrist-worn, the device 500 can be ankle-worn or waist-worn, for example. The device 500 can be configured to convert, translate and/or transform audio energy (e.g., noise or live music at a concert) into one or more haptic and/or light representations of the bassline (and/or treble and/or midranges) of the audio energy in real-time. In one embodiment, no sound or music is recorded by the device 500. In an alternative embodiment, the device 500 can be configured to record the sound and/or the music. In one embodiment, in contrast to the prior art, the device 500 does not need to be paired to anything (e.g., via BLUETOOTH) to operate; instead the device is always "listening" for audio energy (for example, of a certain decibel) to trigger the conversion, translation and/or transformation.

Figure 2:
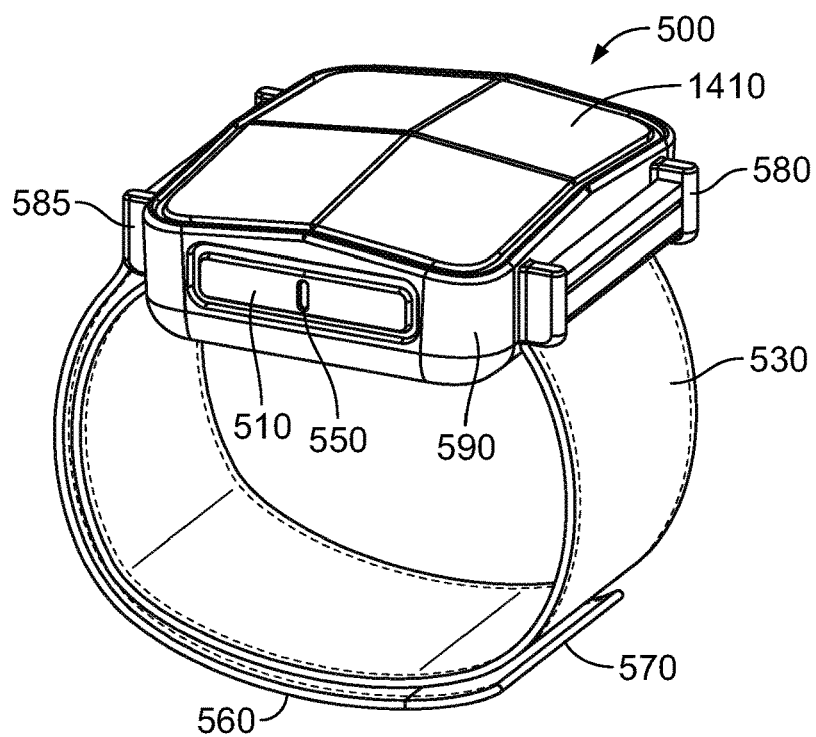
FIG. 2 is another perspective view of a device in accordance with one embodiment of the presently disclosed technology.
Figure 3:
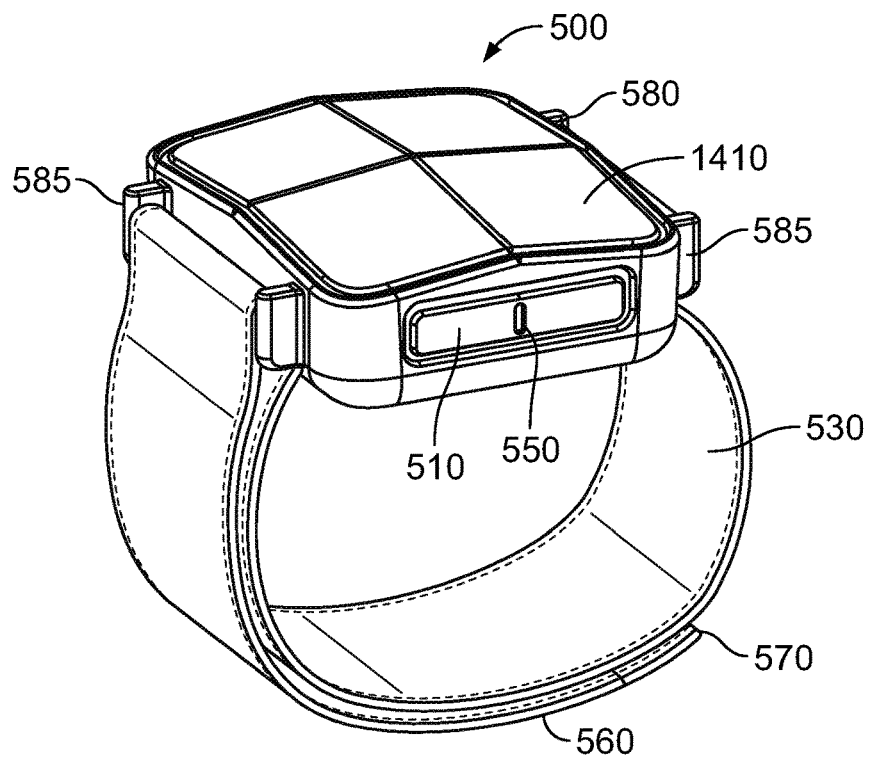
FIG. 3 is yet another perspective view of a device in accordance with one embodiment of the presently disclosed technology.
Figure 4:
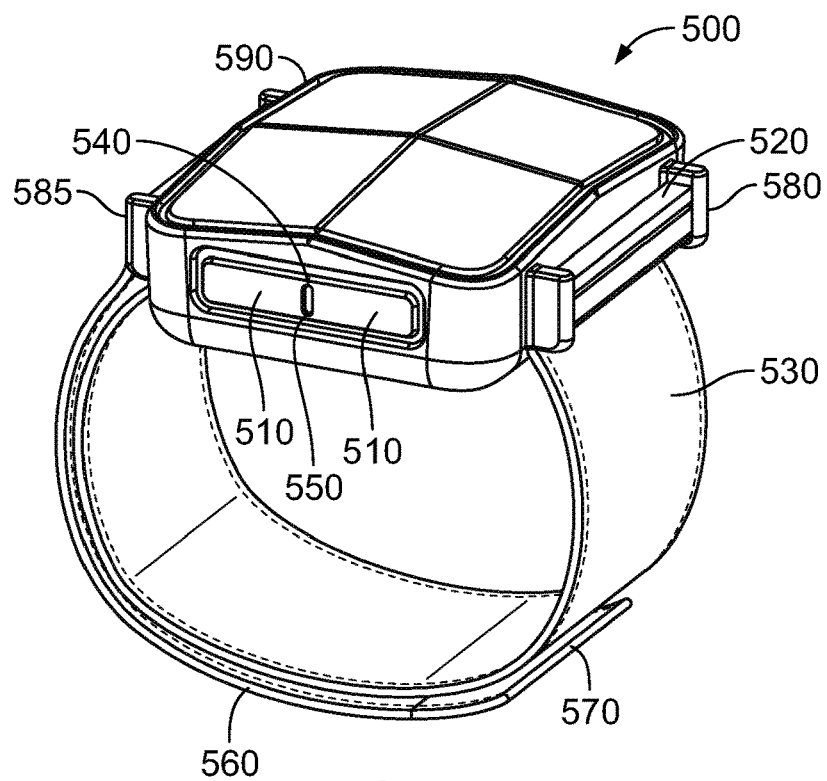
FIG. 4 is still a further perspective view of a device in accordance with one embodiment of the presently disclosed technology.
Figure 5:
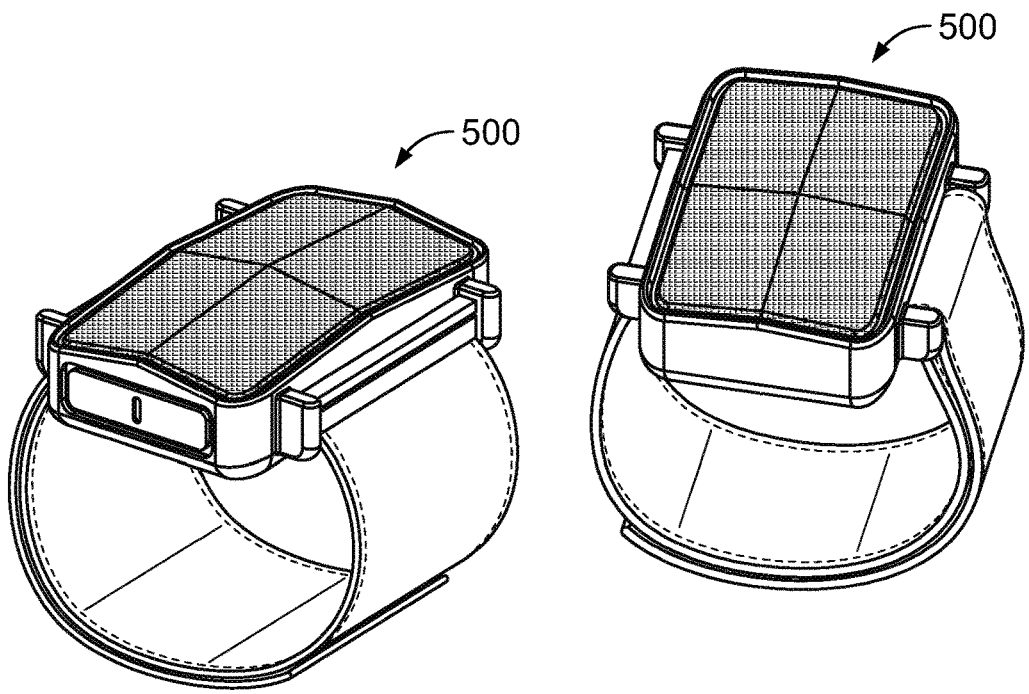
FIG. 5 depicts an exemplary embodiment with the LED lights activated in in one of several different colors.
Figure 6:
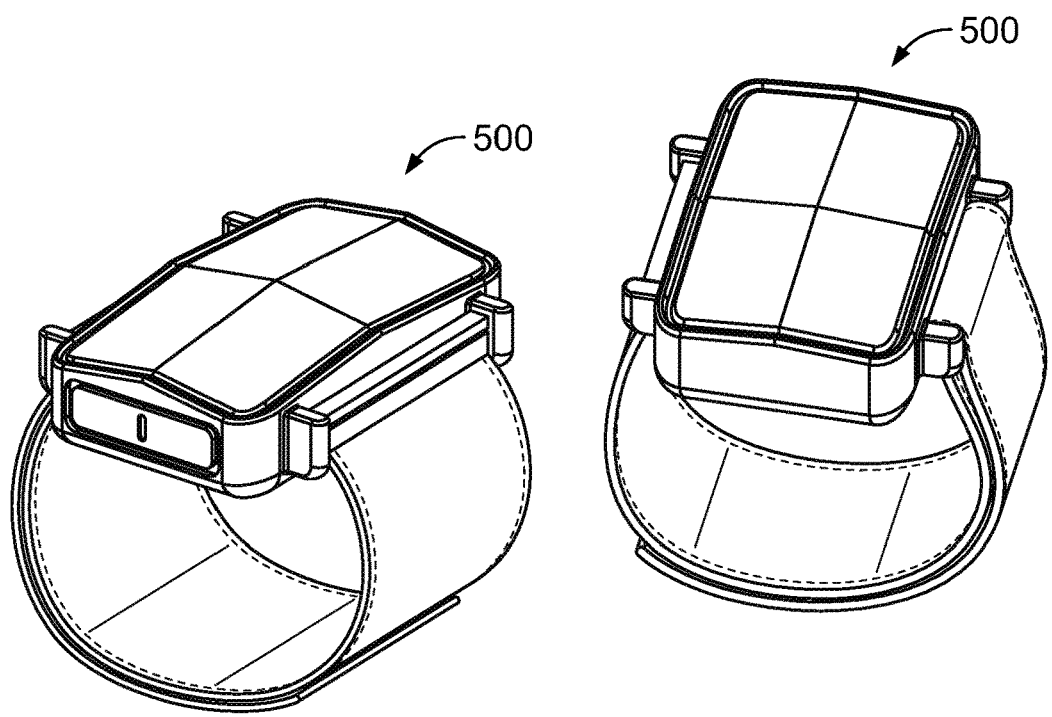
FIG. 6 depicts an exemplary embodiment with the LED light(s) turned off or in a low power mode.

In some examples, the device 10 includes a width of 42 mm and a length of 52 mm. FIG. 2 shows the height of the same conceptual exemplary embodiment. FIG. 3 shows the details of the lens and body of the exemplary embodiment. FIG. 4 shows further details of one embodiment of the device, generally designated 500. The device 500 can includes two control buttons 510, a first tab 520, a strap 530, a charging port 540, a reset button 550, a hook and loop closure 560, a second tab 570, a first fastener loop 580, a second fastener loop 585, and a body 590.

The first tab 520 and the second tab 570 can be molded thermoplastic resin (TPR) attached to opposing ends of the strap 530. In some examples, the strap 530 can be formed of woven polyester. The control buttons 510 can be overmolded TPR rubber formed as part of the body 590. One button can be configured to control the light(s) (e.g., the LED(s)), and the other button can be configured to control the haptic feedback. The functioning of the button 510 is described in more detail above. A charging port 540 can be located between the buttons 510. In one embodiment, the charging port 540 is a barrel charging port. In an alternative embodiment, the charging port 540 can be another interface suitable for receiving at least a portion of a cable capable of transferring power to an internal battery. A reset button 550 can be located beneath the charging portion 540.

The strap 530 can be configured to close through or by a hook and loop closure. To attach the strap 530 to the body 590, the second tab 570 can be passed through the first fastener loop 580 and pulled until the first tab 520 engages the first fastener loop 580. Then, the second tab 570 can then be passed through the second fastener loop 585. The second tab 570 can be pulled until the loop created by the strap 530 and the body 590 reaches the desired diameter. Then, the strap 530 can be folded upon itself along the cross section where the strap 530 engages the second fastener loop 585. The strap 530 can then be engaged with itself with the hook and loop closure 560. In an alternative embodiment, the hook and loop closure can be replaced with any suitable attachment mechanism capable of retaining the device at a fixed location.

The device 500 can, in one alternative embodiment, record a history that reflects the functioning of the device 500. This history can include the color of the light and/or the intensity of the haptic feedback at each point in time when the device is in an active mode. In an alternative embodiment, the history can include both the color of the light and the intensity of the haptic feedback at each point in time when the device is in an active mode. The haptic and/or vibrational representation of the sound and/or the music can be generated in any of a variety of ways, such as by one or more haptic ERM motors, linear haptic motors, and/or a piezo haptic motors. The light representation of the sound and/or the music can be generated via at least one RGB LED. In alternative embodiments, visual displays using other technology may be used.

The sound and/or music can be received by the device via the microphone(s) and then processed as a digital signal. The output of the haptic and/or light response can be generated by applying a low pass filter to the real-time digital signal(s) and then altering the signal(s) with a new method to identify the bassline (and/or treble and/or midranges) more clearly so it can be represented in the haptic and/or light response. In an exemplary embodiment, the haptic motor can be driven by a Texas Instruments (TI) haptic chip set and the TI haptic motor algorithm embedded on the chip can be used to drive the haptic response.

The LED can be controlled with an original method. The brightness and color of the light can be driven by the trailing average of the relation of, for example, bass-to-overall-audio over time. If the intensity of treble and midrange of the music increases quickly, the light can be configured to change from blue to pink to white. In alternative embodiment, different color combinations and spectrums can be used without deviating from the invention.

In one embodiment, the device 500 can include at least one or two or more spaced-apart control buttons 510, at least one battery that can be rechargeable, at least one RGB LED, at least one haptic ERM motor, linear haptic motor, and/or a piezo haptic motor, and at least one microelectromechanical systems (MEMS) microphone. The device 500 can produce at least one light response which can change in color, frequency, and/or intensity to music or other sound. The device 500 can produce at least one haptic response which changes in intensity and/or frequency to music or other sound. In the embodiment where the device 500 is a watch, the device can include an adjustable elastic wrist band 530 with printed graphics and hook-and-loop closure. The wrist band 530 can integrate with one or more RFID tags for various purposes, such as ticketless entry and/or payment at participating festivals/venues. The wrist band 530 can have a silicone "cork" to allow the user to easily swap bands. The device 500 can include a housing with translucent lens for light diffusion. The housing and/or any other portion of the device can be formed of a light-weight, high-strength material, such as a plastic or metal. The housing can include one or more rubber gaskets at part seams to provide some water-resistance.

In operation of one embodiment, pressing one button 510 (e.g., the haptic button) can cycle the device through three or more separate intensity settings for the haptic vibration response (e.g., High, Medium, Low, Off). Pressing a second button 510 (e.g., the light button) can turn the at least one LED on or off. When the battery is charged, the device's default state can be in "sleep" mode (e.g., all microcontrollers are set to low-power mode). When either function (e.g., vibration or light) is activated through a button-press, the microcontrollers can all be set to regular power consumption. In practice, this setup means there is no dedicated "Power switch" that only turns on the device. However, in alternative embodiments, a separate power switch can be included to immediately put the device on low power mode, or to turn off power completely.

While on and awake, the device 500 can be configured to filter incoming audio with a high pass filter at, for example, 60 hz (q=1.0) and two low pass filters at, for example, 130 hz (q=0.8) and 140 hz (q=1.4), respectively. The Root Mean Square (RMS) average of this audio signal can be calculated at a particular frequency, such as every 10 ms. These values fall in between 0 and 900. A running array can hold a predetermined number of the RMS values, such as the last 50 RMS values, for tracking local average, minimum, and maximum values. These minimum and maximum values can then be tracked and have their averages calculated. From here, device can calculate a value called "PWMoutput" that can determine the amount of light from the LED(s) and/or the amount of haptic vibration. This can be calculated, for example, by using the minimum and maximum averages as the initial low and high bounds, and proportionally scaling the average RMS value from between those bounds to being between 0 and 255. Low values with an average RMS less than 10 are automatically output as 0. This value can be compressed with basic audio compressor logic, for example compressing values above 130 at a rate of 1:5, and applying a gain of 1.9 to the resulting signal.

Figure 22:
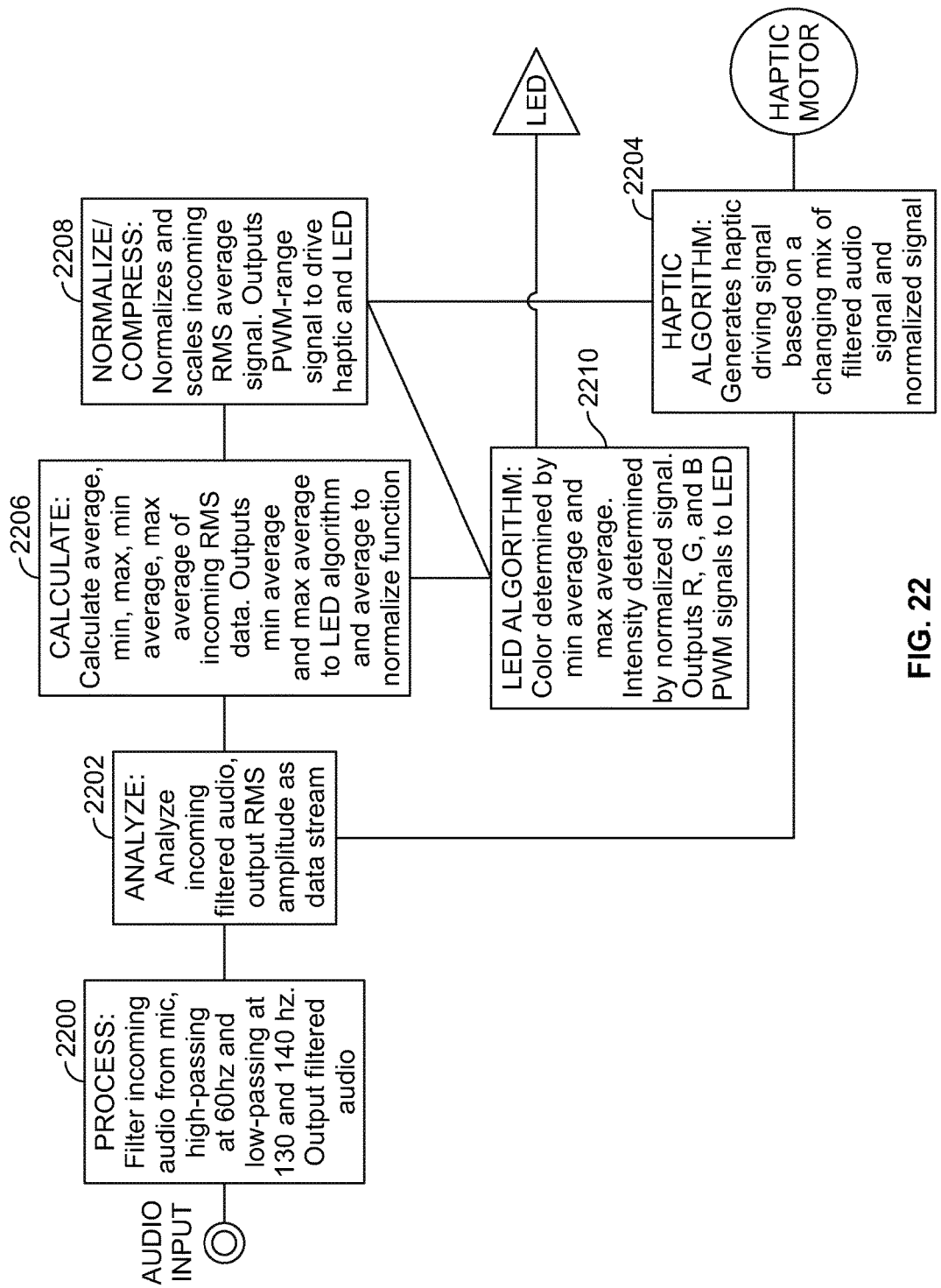
FIG. 22 is a logic diagram employing one or more algorithms of the presently disclosed technology.

In one embodiment, the specific color ratios for lighting the red, green and blue channels of the LED(s) can be determined by one or more of the algorithms 2210. An example of a logic diagram employing one or more algorithms of the presently disclosed technology is shown in FIG. 22. The device 500 can filter incoming audio signals received from the microphone. In some examples, the inputted signals are passed through a high pass filter, e.g., at 60 hz, and/or a low pass filter, at 130 and 140 hz, and the filtered signal is output to the processor to be analyzed (2200). The processor outputs an RMS amplitude as a data stream (2202). The processed data stream can be input to a haptic algorithm to generate haptic driving signals based on a changing mix of filtered audio signal and normalized signal to drive the haptic motor, e.g., to move the device 500 based on the incoming audio (2204). Additionally, the processor can calculate an average, minimum, maximum, minimum average and/or maximum average of the RMS data (2206). The processor can output the minimum average and maximum average to the LED algorithm (2210) and the normalize/compress function (2208). The normalize/compress function normalizes and scales incoming RMS average signals and outputs PWM-range signals to drive the haptic motor and the LEDs (2208). In some examples, the LED algorithm can determine color based on the minimum average and the maximum average. In some examples, the LED algorithm determines light output intensity by the normalized signal, and output R, G and B PWM signal to the LED(s) (2210).

In one embodiment, the algorithm is designed to move from blue to red to white if the minimum average value rises consistently, reaching white as minimum average approaches a predetermined value. Green values can be limited to a maximum of half brightness to avoid a green tint when lit white. The outputs of these equations can be multiplied by PWMoutput and used to generate the new target values for the R, G and B channels of the LED(s). The device can be configured to calculate the difference from current LED level, and defines rate of intensity change to sooth LED transitions. The LED(s) can be turned on or off with the LED button(s).

In one embodiment, the haptic motor can be driven by the audioToVibe feature of one or more particular chips, such as one or more manufactured or produced by Texas Instruments. This feature can simulate pulsing the motor based on, for example, bass pulses in music that is fed into the chip, in one embodiment looking specifically for sound around 125 hz. The device instead sends the chip(s) a 125 hz sin wave with its amplitude controlled by a particular algorithm. Users can move through the options of modifying the haptic level by pressing the haptic button(s). As users move through the options, they can receive a 400 ms haptic bump at the intensity of the selected setting.

In one embodiment, the device does not fully shut off unless totally out of power. Rather, it can switch to a lower power sleep mode if both the LED and haptic motor are turned off, or if the device goes a predetermined amount of time, such as an hour, without the maximum average value going over a predetermined value. In sleep mode, the haptic driver written to standby Mode and a particular audio shield can be powered down. The device can be woken up by pressing either button. In one embodiment, the LED and haptic are always addressed separately by the buttons in this regard; waking up the device with the LED button will not turn the haptic on, and vice versa. The haptic gain amount will always wake into its highest setting, regardless of its setting when falling asleep.

In one embodiment, the device can include a display button and a haptic button. The display button can control the display. When the display button is pressed for the first time, the display can be turned on. A second press of the display button can put the display into low power mode. In an alternative embodiment, the display can include or exhibit alternative color schemes. When the display button is pressed for a third time, the display can change its color scheme. For example, the first color scheme can include "cooler" colors, such as blue and its shades, and the second color scheme can include "warmer" colors, such as yellow and its shades.

The haptic button can control the haptic feedback motor. In one embodiment, when the haptic button is pressed for the first time, the haptic feedback is turned on at a predetermined haptic intensity. A second press of the haptic button can put the haptic feedback motor into low power mode. In an alternative embodiment, the haptic feedback motor can include two or more intensity levels. In such an alternative embodiment, the first press of the button places the haptic feedback motor at a first level of intensity. The second press of the button can put the haptic feedback motor at a second level of intensity, and so on and so forth. For ease of use, the intensity of the haptic feedback steadily increases with each press of the haptic button. In an alternative embodiment, the intensity of the haptic feedback steadily decreases with each press of the haptic button.

Figure 7:
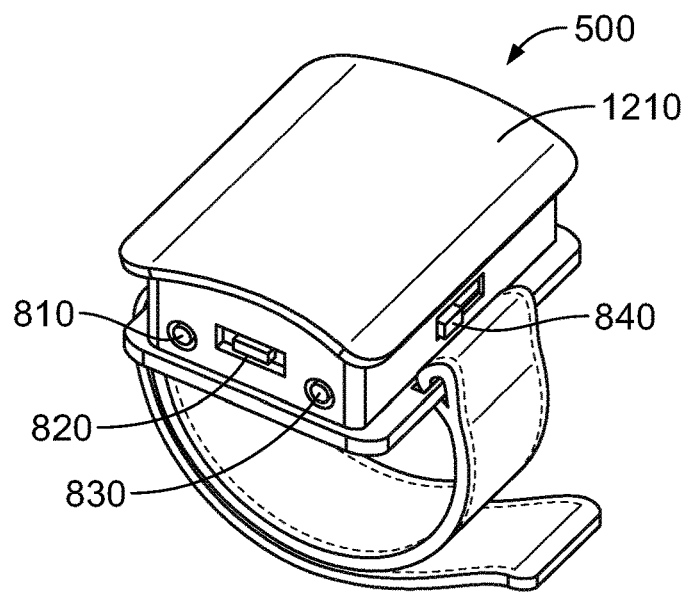
FIG. 7 is a perspective view of a device in accordance with one embodiment of the presently disclosed technology.

FIG. 7 shows certain external components of the device of one embodiment of the present disclosure. In particular, the device 500 can include at least one LED setting button 810, a charging port 820, a haptic setting button 830, and a battery connection switch 840. Two or more of these features can be electrically connected within the body of the device. In operation the battery connection switch 840 can include two settings. In one embodiment, when the battery connection switch 840 is in "on" position, the device will power up. Each of these components can be set default to a Low-Power Mode, with all functions Off. In an alternative embodiment, the default may be set to active mode. In such an alternative, the device can switch to low power mode after a predetermined amount of time. The LED setting button 810 can turn the LED display on. The haptic setting button 830 can turn the haptic feedback device on. The device can include different settings from low vibration to strong vibration. In an alternative embodiment, the haptic feedback button 830 may be replaced with a dial, for example, to increase or decrease the intensity of the vibrations produced by the haptic feedback device. When the LED setting button 810 and/or the haptic setting button 830 functions are turned "on," the device will power up the internal components. If all functions are turned "off," these components of the device will return to Low-Power mode. If the device does not detect audio (e.g., louder than a human voice) for a predetermined amount of time (e.g., one hour), the device will automatically return to Low-Power mode.

In an alternative embodiment, the device 500 may not have a battery connection switch. In such an embodiment, the device remains powered when the battery is charged, but internal components remains in Low-Power mode until functions are turned on. The device 500 can also have a momentary-action kill switch button, for example, to disconnect the battery, and force the internal components to reboot. The device 500 can have the same shape of lens 1410 as previously shown, or include a different shape 1210, e.g., a rounded shape.

The charging port 820 can be a micro USB charging port and can provide an interface to charge the battery within the device. In an alternative embodiment, the charging port 820 can be a barrel port, USB type C port, or an Apple Lightning port, for example. In another alternative embodiment, the charging port 820 can be completely removed or omitted. In such an embodiment, the battery may be charged using wireless charging methods, for example.

Figure 8:
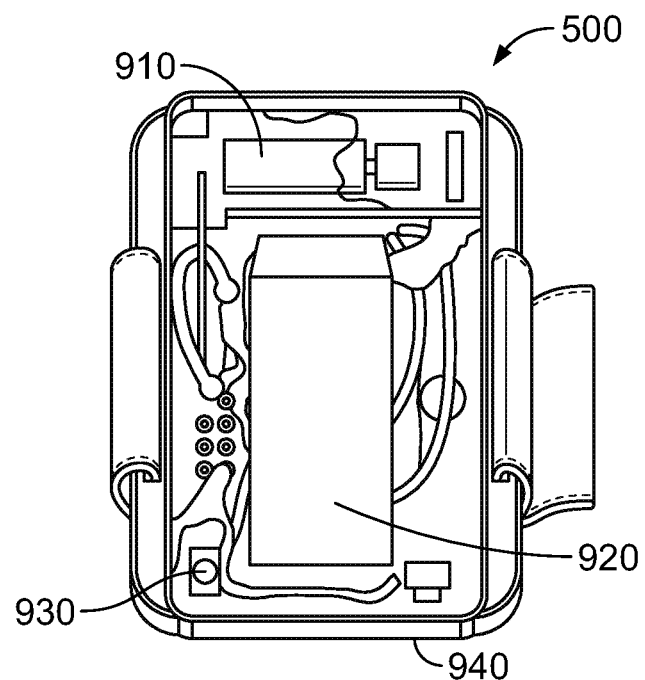
FIG. 8 is a top plan view of certain internal components of a device in accordance with one embodiment of the presently disclosed technology.

FIG. 8 depicts at least certain internal components of an exemplary embodiment of the device. The device 500 includes one or more output devices 900, including, for example, at least one haptic motor 910 and at least one LED with LED diffuser 920. The device 500 also includes one or more input devices, e.g., at least one MEMS Microphone 930. Additionally or alternatively, the device 500 can include at least one processor, e.g., a three-dimensional or stack-up integrated circuit (IC) 940. In some examples, the IC 940 can be positioned below or beneath the LED diffuser 920. The IC 940 can include at least one microcontroller, at least one haptic driver, and/or at least one audio codec. The battery (not shown) can be positioned below the IC 940. The haptic motor 910, the LED diffuser 920, and the MEMS microphone 930 can be electrically connected to the microcontroller through one or more ports in the IC 940.

Figure 9:
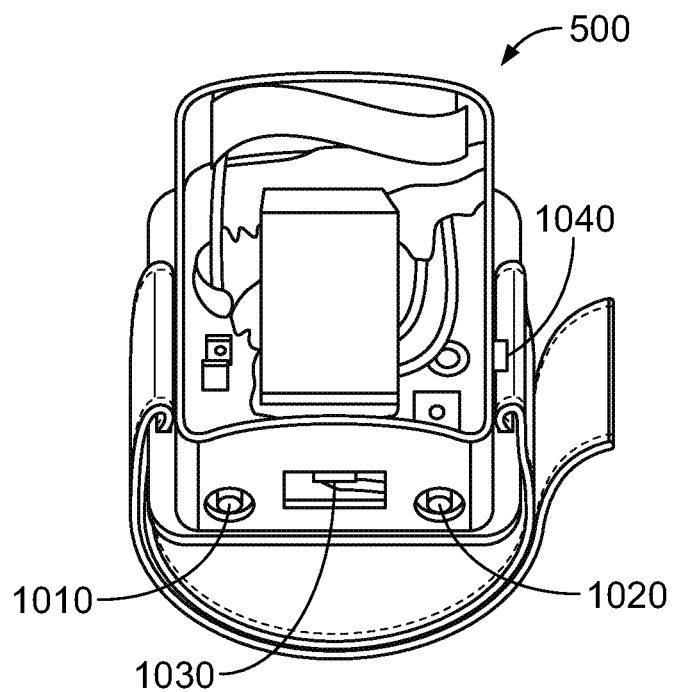
FIG. 9 is a perspective view of certain internal components of one embodiment of the presently disclosed technology.

The FIG. 9 depicts another view of the internal components of an exemplary embodiment of the present invention. The FIG. 9 shows a first button 1010, a second button 1020, a charging port 1030, and a two position sliding switch 1040. The positioning and/or location of the various components in FIG. 9 is exemplary only. For example, in alternative embodiments, the first button 1010 and the second button 1020 may be placed one the opposite sides of the device.

Figure 10:
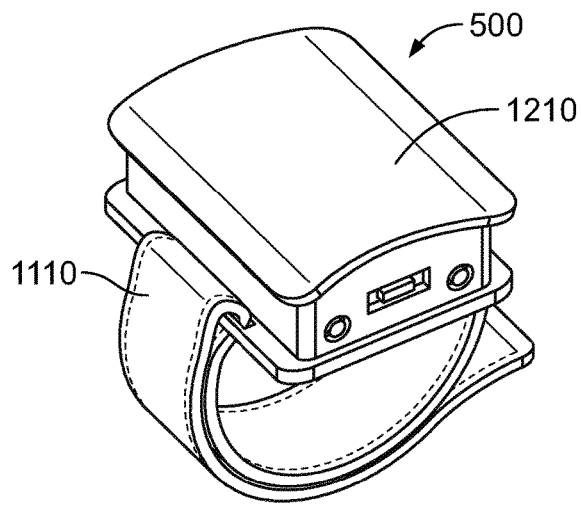
FIG. 10 is a perspective view of a device in accordance with one embodiment of the presently disclosed technology.
Figure 11:
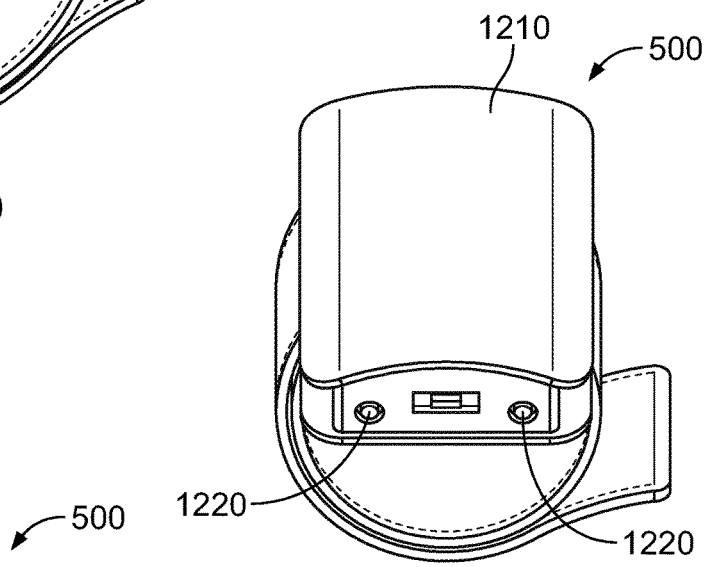
FIG. 11 is another perspective view of a device in accordance with one embodiment of the presently disclosed technology.
Figure 12:
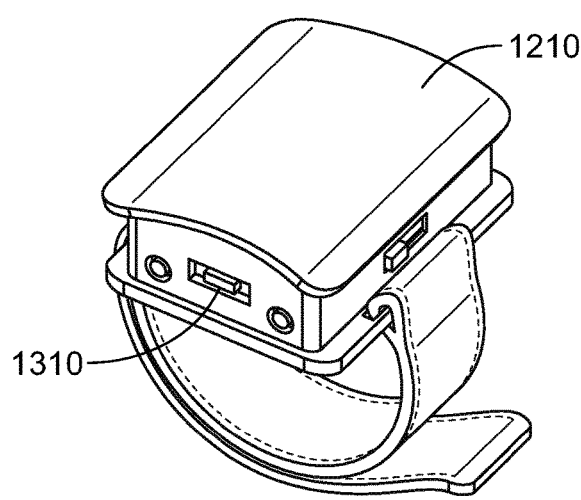
FIG. 12 is yet another perspective view of a device in accordance with one embodiment of the presently disclosed technology.
Figure 13:
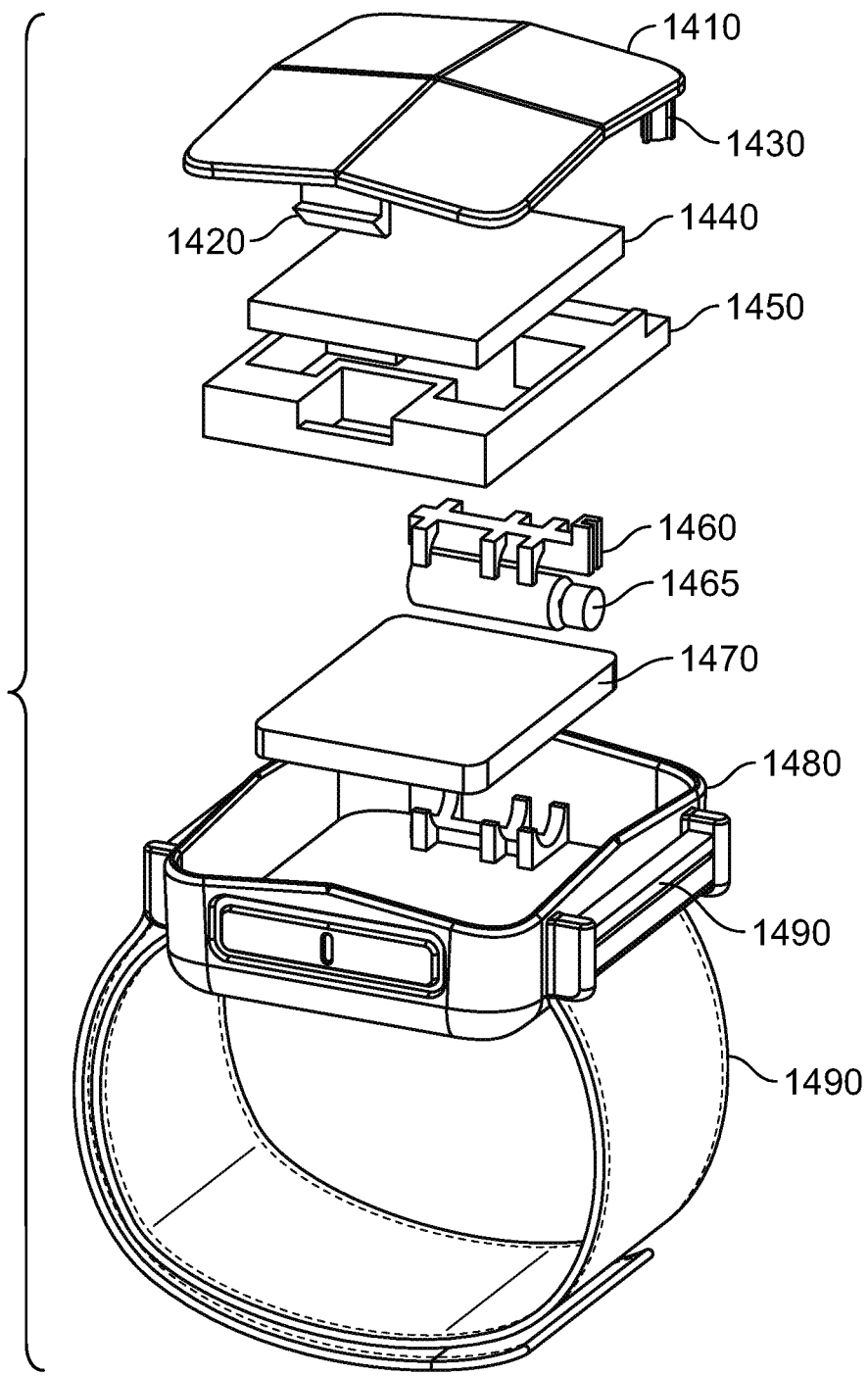
FIG. 13 is a partially exploded view of a device in accordance with one embodiment of the presently disclosed technology.
Figure 14A:
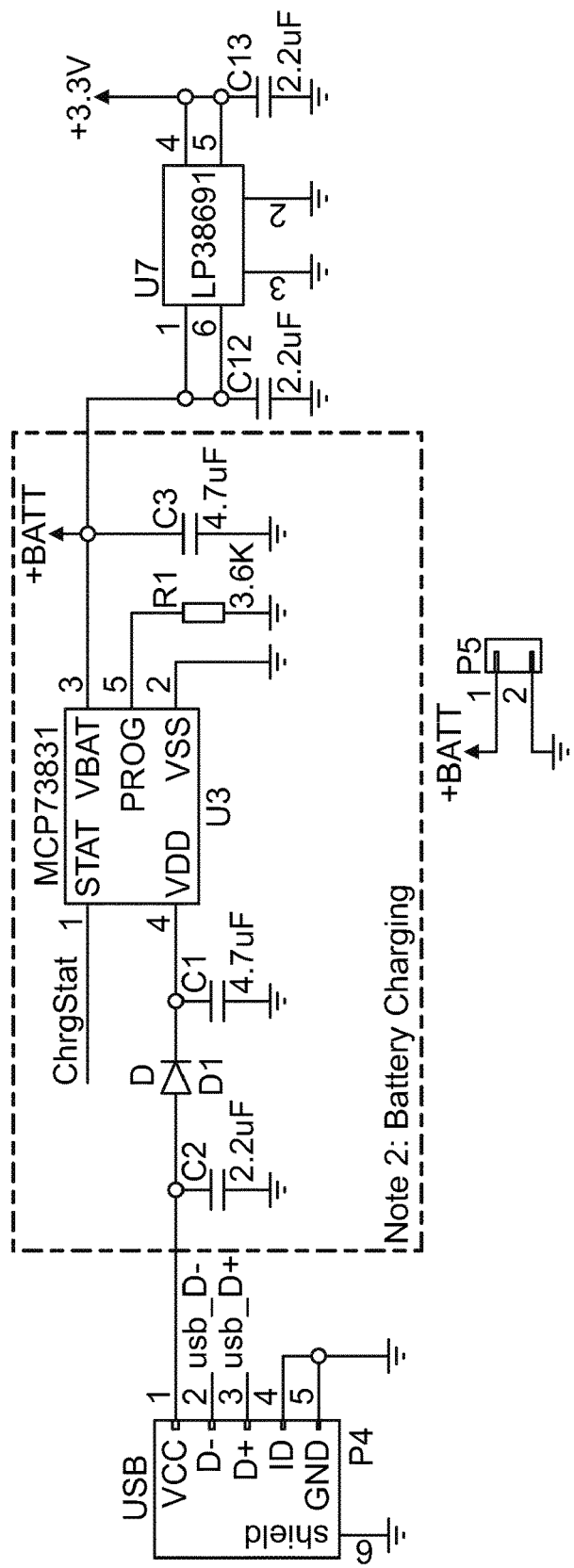
FIGS. 14A-D is a schematic diagram of example electrical components of a device in accordance with one embodiment of the presently disclosed technology.
Figure 14B:
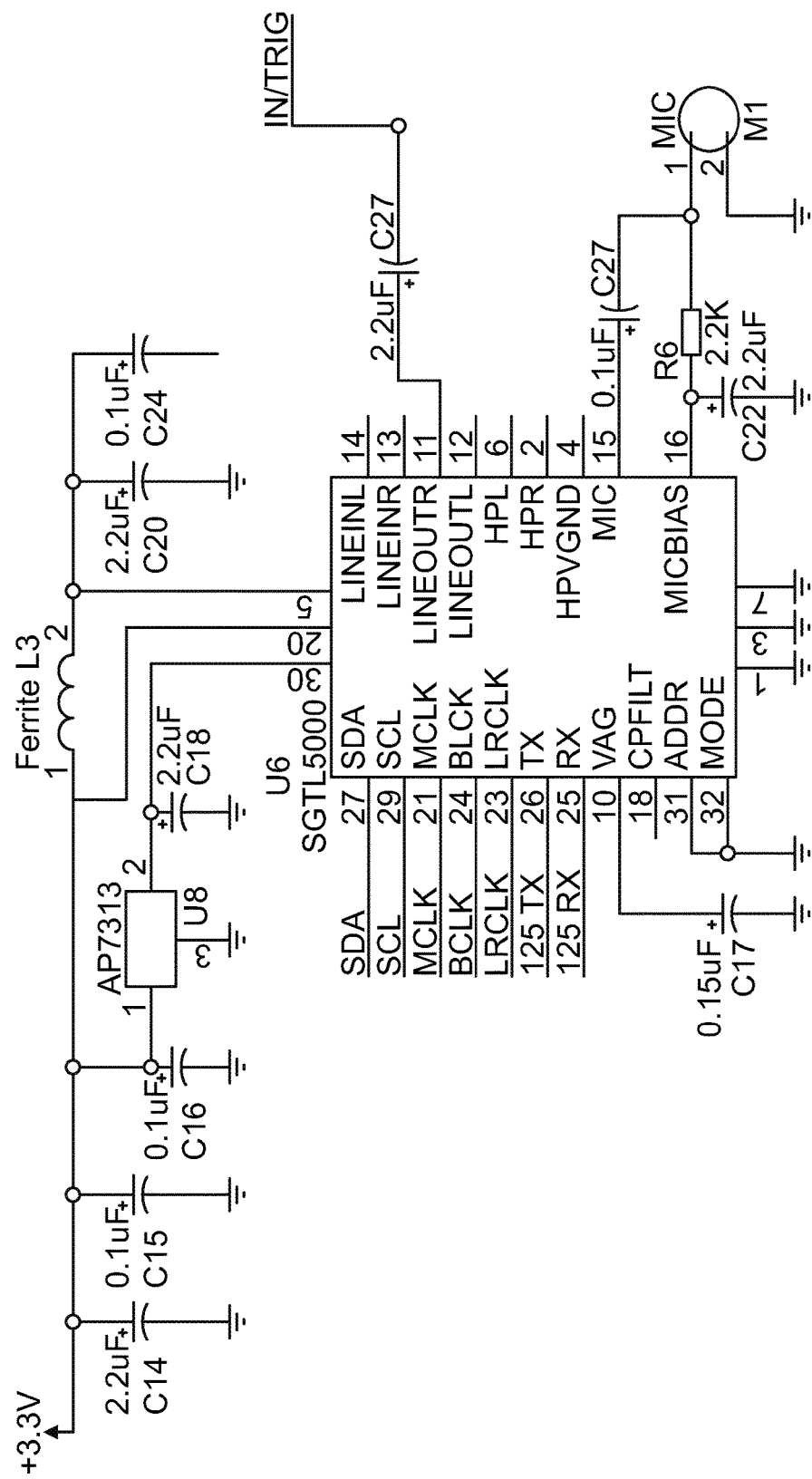
Figure 14C:
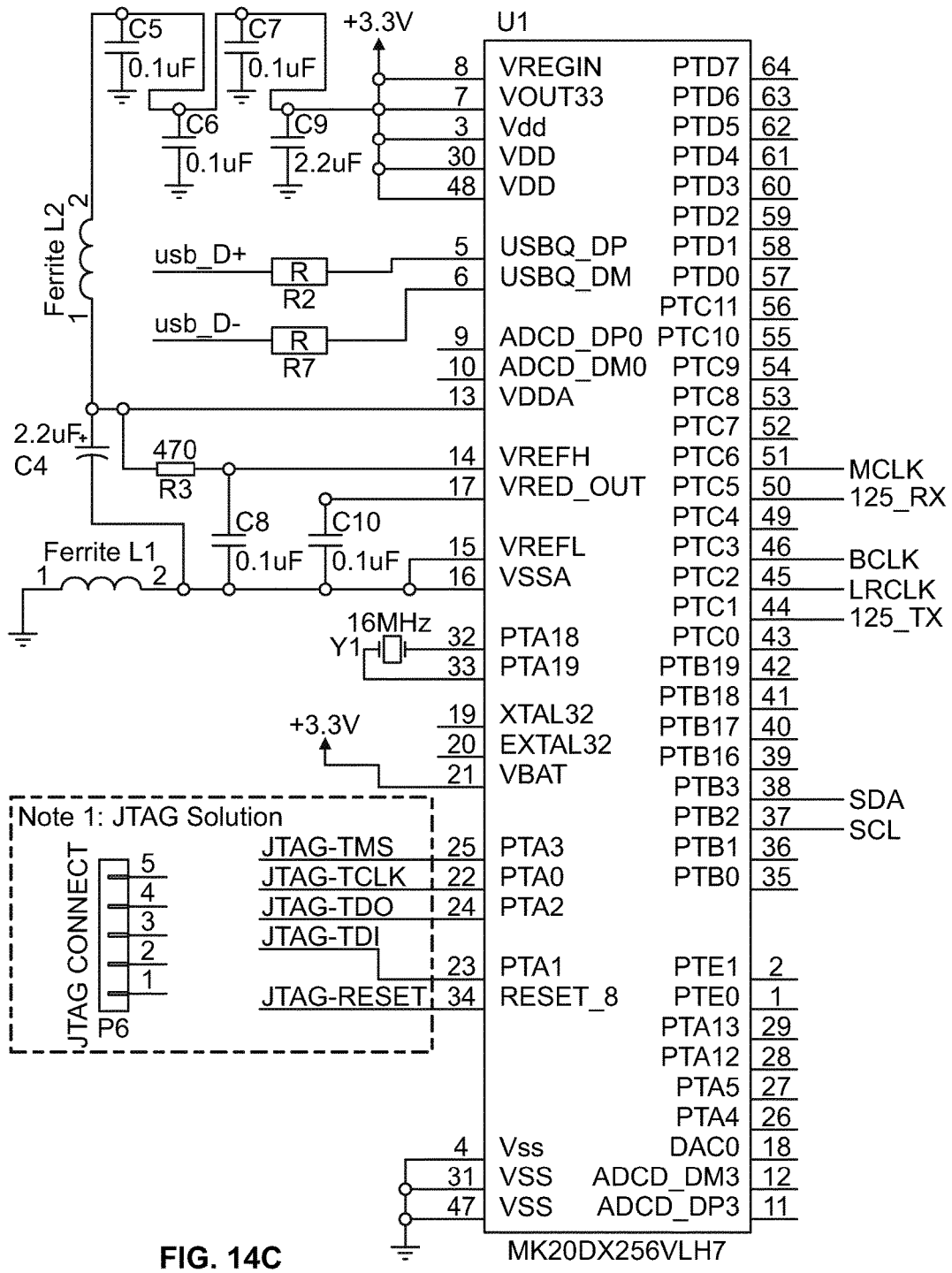
Figure 14D:
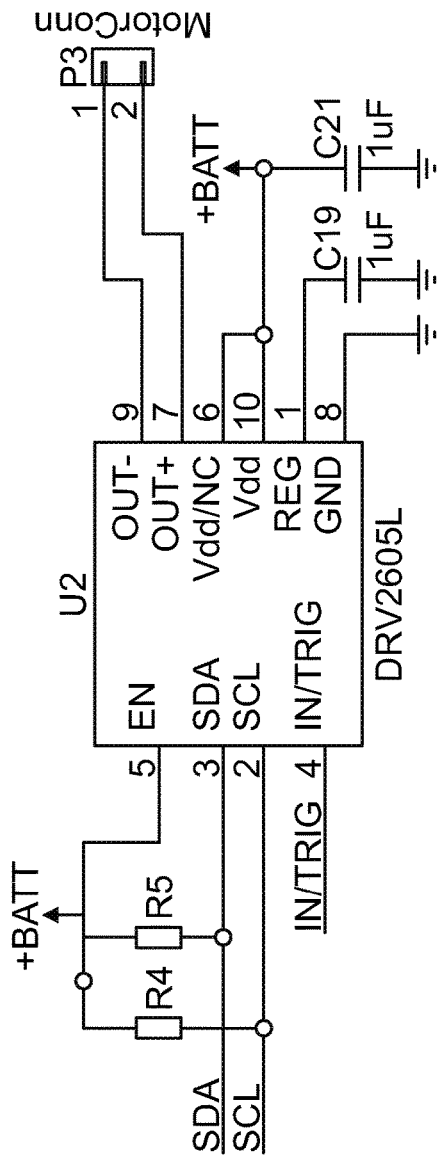

FIG. 10 depicts another view of an exemplary embodiment of the device. FIG. 10 shows a strap 1110 in closed position. The strap 1110 can be formed of an elastic material. The strap 1110 can be selectively opened and/or closed (e.g., attached and/or disengaged) by the user. FIG. 11 depicts another view of an exemplary embodiment of the device. FIG. 11 shows a lens 1210 and external interface 1220. The lens 1210 can be made of smoked grey lens with frosted finish. The frosted finish allows the light to be diffused. In alternative embodiments, the lens 1210 may be made of clear glass to allow for a clear view of the LED. The external interface 1220 can include a charging port and two buttons. In an alternative embodiment, the buttons may include or be formed of thermoplastic polyurethane TPU rubber to protect the buttons. FIG. 12 shows another view of an exemplary embodiment of the device. The device in FIG. 12 shows an exemplary location of a momentary action kill switch 1310. FIG. 13 shows a partially exploded view of an exemplary embodiment of the device. The device in FIG. 13 can include a lens 1410, at least one snap fit 1420, a screen boss 1430, an LED diffuser 1440, a printed circuit board ("PCB") 1450, a motor tie down 1460, a haptic motor 1465, a battery 1470, a housing 1480, a silicone stopper 1490, and an elastic strap 1495. FIGS. 14A-D shows a schematic of the electrical components of an exemplary embodiment of the present invention.

An exemplary embodiment of the device can use an electret condenser microphone. By way of an example, CUI Inc. manufactures an electret condenser microphone with the part number CMA-4544PF-W. An exemplary electret condenser microphone can exhibit one or more of the following features:

Directivity: omnidirectional
Sensitivity (S): $-44\pm2$ dB f=1 KHz, 1 Pa 0 dB=1V/Pa
Sensitivity reduction ($\Delta$S-Vs): $-3$ dB f=1 KHz, 1 Pa Vs=3.0~2.0 V dc
Operating voltage: 3 V dc (standard), 10 V dc (max.)
Output impedance (Zout): 2.2 K$\Omega$ f=1 KHz, 1 Pa
Operating frequency (f): 20~20,000 Hz
Current consumption (IDSS): 0.5 mA max. Vs=3.0 V dc RL=2.2 K$\Omega$
Signal to noise ratio (S/N): 60 dBA f=1 KHz, 1 Pa A-weighted
Operating temperature: $-20$~$+70°$ C.
Storage temperature: $-20$~$+70°$ C.
Dimensions: 09.7×4.5 mm
Weight: 0.80 g max.
Material: Al
Terminal: pin type (hand soldering only)
RoHS: yes The "Pascal (Pa)" indication of sensitivity can be used, per the recommendation of the I.E.C. (International Electrotechnical Commission). The sensitivity of "Pa" will increase 20 dB compared to the "ubar" indication. Example: $-60$ dB (0 dB=1V/ubar)=$-40$ dB (1V/Pa)

FIG. 15 shows the appearance of an exemplary microphone 1600 that may be used as part of an exemplary embodiment of the present invention. FIG. 16 shows the measurement circuit of the exemplary microphone shown in relation to FIG. 15. FIG. 17 shows the frequency response curve of the exemplary microphone 1600 shown in relation to FIG. 15.

In an alternative embodiment, a High SPL Analog Microphone with Extended Low Frequency Response can be used. As a way of example, description of such an analog microphone produced by the company InvenSense with the part number ICS-40300 will be described below.

The ICS-40300 is a low-noise, high SPL MEMS microphone with extended low frequency response. The ICS-40300 consists of a MEMS microphone element and an impedance converter amplifier. The ICS-40300 low frequency response makes it an excellent choice for applications requiring precise phase matching. The ICS-40300 is pin compatible with the INMP401 and INMP411 microphones, providing an easy upgrade path. The ICS-40300 has a linear response up to 130 dB SPL. It offers low frequency extension down to 6 Hz, resulting in excellent phase characteristics in the audio range. Low current consumption enables long battery life for portable applications. The ICS-40300 is available in a 4.72 mm×3.76 mm×3.5 mm surface-mount package. It is reflow solder compatible with no sensitivity degradation. Applications include: Active Noise-Cancelling Headsets; Teleconferencing Systems; Studio Microphones; Live Microphones; Security and Surveillance; and Photoacoustic Gas Sensing. Features can include: 4.72×3.76×3.5 mm Surface-Mount Package; Extended Frequency Response from 6 Hz to 20 kHz; 130 dB SPL Acoustic Overload Point; sensitivity of −45 dBV; ±2 dB Sensitivity Tolerance; Omnidirectional Response; High SNR of 63 dBA; Low Current Consumption: <220 µA; Single-Ended Analog Output; High PSR of −80 dBV; Compatible with Sn/Pb and Pb-Free Solder Processes; RoHS/WEEE Compliant.

FIG. 18 shows a functional block diagram of the ICS-40300. Functionality of the ICS-40300 is also described in U.S. Pat. Nos. 7,449,356; 7,825,484; 7,885,423; 7,961,897, which are each incorporated here by reference in their entirety (and copies of which are enclosed).

Figure 19:
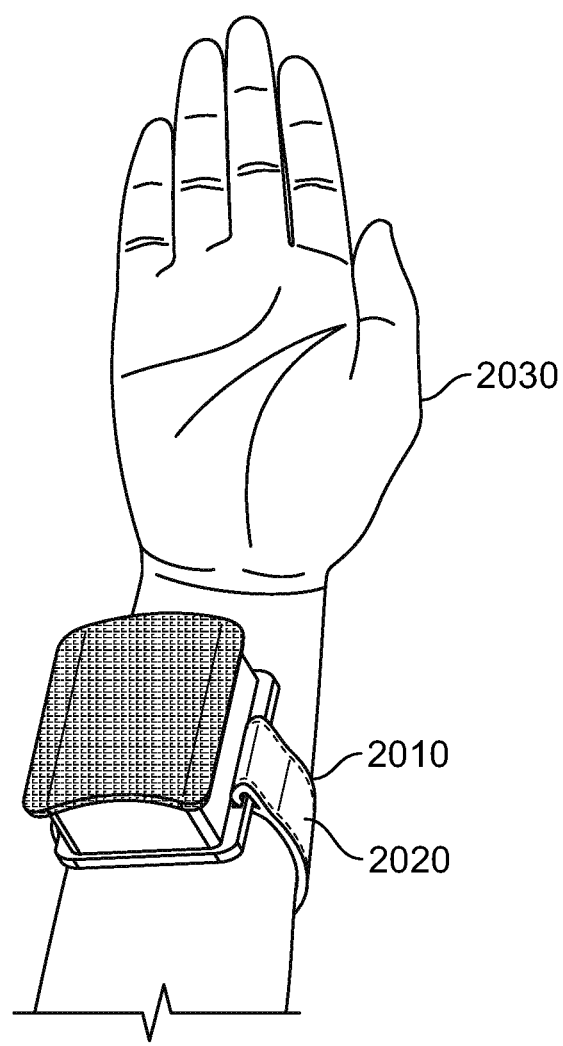
FIG. 19 shows one use of an exemplary embodiment of the presently disclosed technology.

FIG. 19 shows an exemplary use of a device 2010 as describe above in relation to FIGS. 7-12. The exemplary use can include a device 2010, a band 2020, and a user 2030. The band 2020 is described in more detail below in relation to FIG. 20. In use, the user 2030 can place the band around the user's wrist. In alternative embodiments, the user may place the device 2010 in different parts of the body. In further alternative embodiments, the band 2020 may be omitted. In this case, the device may be attached to the body of the person by various other means that would allow the device 2010 to remain affixed to the user's body, such as placing the device 2010 in the user's pocket.

Figure 20:
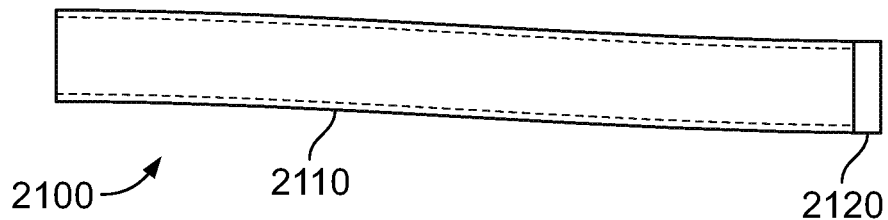
FIG. 20 depicts a band of a device of one embodiment of the presently disclosed technology.

FIG. 20 shows a band 2100 as shown above in relation to FIGS. 7-12. The band 2100 can include a silicon tab 2120 at one or both ends thereof, and a cotton or plastic strap 2110. The strap 2110 can be manufactured from a variety of materials that can take the shape of a person's wrist. The silicon tab 2120 can be sawed (e.g., have a jagged edge) at or near the end of the band. The silicon tab 2120 can also be attached to the strap 2110 using any number of means, including without limitation sawing, gluing, buttoning, or molding. The band 2100 can be merchandised by manufacturing the strap 2110 to have predetermined shapes or characters, or painting the strap with logos or writings. In one embodiment, the band 2100 can be permanently attached to the device. In an alternative embodiment, the band can be removably attached to the device using the silicon tab 2120. In such an alternative embodiment, the band 2100 can be removed and replaced with another band 2100 by detaching the silicon tab 2120 from the device and removing the band 2100.

In alternative embodiments, the band 2100 can include a mechanical based fastening product, including fabric hook and loop fastener, manufactured and sold under the brand name "Velcro" or any other suitable alternative. Such a device can include two loops on alternative ends. The band can include a free end and a tabbed end. The free end can pass through a loop on the device from the direction of the front of the device toward the back of the device. The free end can be pulled until the tabbed end engages the first loop. The free end can then be passed through the second loop from the direction of the back of the device toward the front of the device. The user can then pass his hand through a loop created by the device and the band until the back of the device is placed on the person's wrist. In alternative embodiments, the user can place the back of the device to anywhere else on the persons arm or on the person's leg by passing the user's feet through the loop. Once the user places the back of the device at the desired location, the person can pull the free end until the band tightly engages the user's wrist. The band can then be folded into itself and pressed into itself to engage the mechanical fastener. In alternative embodiments, the band can be secured using any type of attachment such as a buckle.

Figure 21:
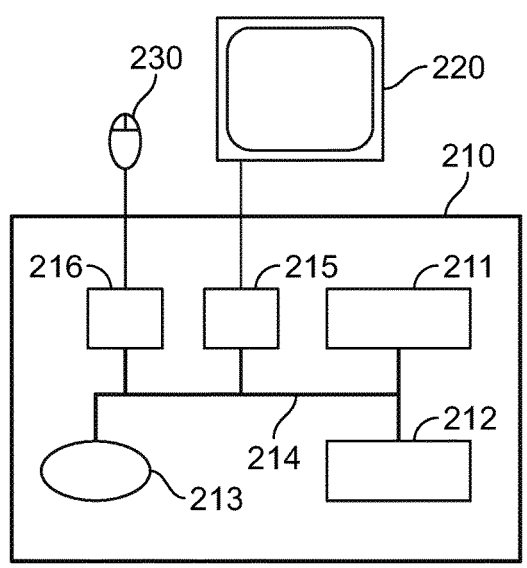
FIG. 21 is a schematic diagram of a computing system of one embodiment of the present disclosure.

One or more of the above-described techniques and/or embodiments can be implemented with or involve software, for example modules executed on one or more computing devices 210 (see FIG. 21). Of course, modules described herein illustrate various functionalities and do not limit the structure or functionality of any embodiments. Rather, the functionality of various modules can be divided differently and performed by more or fewer modules according to various design considerations.

Each computing device 210 may include one or more processing devices 211 designed to process instructions, for example computer readable instructions (i.e., code), stored in a non-transient manner on one or more storage devices 213. By processing instructions, the processing device(s) 211 may perform one or more of the steps and/or functions disclosed herein. Each processing device may be real or virtual. In a multi-processing system, multiple processing units may execute computer-executable instructions to increase processing power. The storage device(s) 213 may be any type of non-transitory storage device (e.g., an optical storage device, a magnetic storage device, a solid state storage device, etc.). The storage device(s) 213 may be removable or non-removable, and may include magnetic disks, magneto-optical disks, magnetic tapes or cassettes, CD-ROMs, CD-RWs, DVDs, BDs, SSDs, or any other medium which can be used to store information. Alternatively, instructions may be stored in one or more remote storage devices, for example storage devices accessed over a network or the internet.

Each computing device 210 additionally may have memory 212, one or more input controllers 216, one or more output controllers 215, and/or one or more communication connections 240. The memory 212 may be volatile memory (e.g., registers, cache, RAM, etc.), non-volatile memory (e.g., ROM, EEPROM, flash memory, etc.), or some combination thereof. In at least one embodiment, the memory 212 may store software implementing described techniques.

An interconnection mechanism 214, such as a bus, controller or network, may operatively couple components of the computing device 210, including the processor(s) 211, the memory 212, the storage device(s) 213, the input controller(s) 216, the output controller(s) 215, the communication connection(s) 240, and any other devices (e.g., network controllers, sound controllers, etc.). The output controller(s) 215 may be operatively coupled (e.g., via a wired or wireless connection) to one or more output devices 220 (e.g., a monitor, a television, a mobile device screen, a touch-display, a printer, a speaker, etc.) in such a fashion that the output controller(s) 215 can transform the display on the display device 220 (e.g., in response to modules executed). The input controller(s) 216 may be operatively coupled (e.g., via a wired or wireless connection) to an input device 230 (e.g., a mouse, a keyboard, a touch-pad, a scroll-ball, a touch display, a pen, a game controller, a voice input device, a scanning device, a digital camera, etc.) in such a fashion that input can be received from a user.

The communication connection(s) 240 may enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

FIG. 21 illustrates the computing device 210, the output device 220, and the input device 230 as separate devices for ease of identification only. However, the computing device 210, the display device(s) 220, and/or the input device(s) 230 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). The computing device 210 may be one or more servers, for example a farm of networked servers, a clustered server environment, or a cloud services running on remote computing devices.

Figure 23:
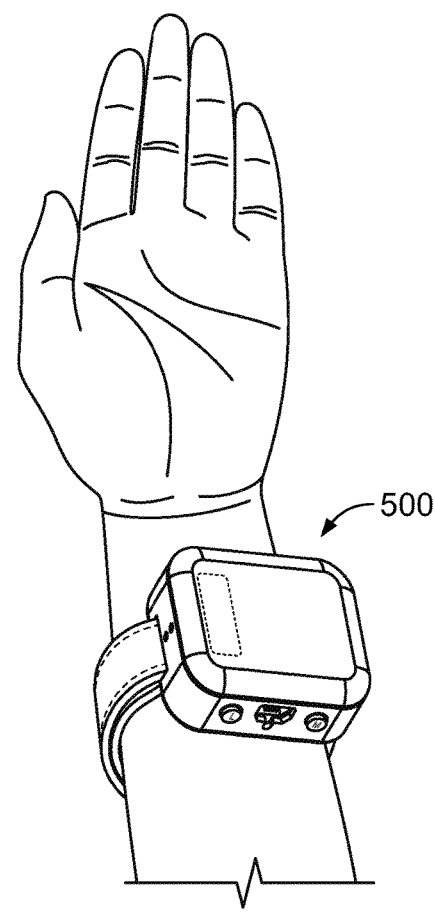
FIG. 23 is a perspective view of a device in accordance with another embodiment of the presently disclosed technology.

FIG. 23 is a perspective view of a device 500 in accordance with another embodiment of the presently disclosed technology. In this example, the lens 2300 includes a generally flat and square shape.

It will be appreciated by those skilled in the art that changes could be made to the embodiments described above without departing from the broad inventive concept thereof. For example, various mechanical and electrical connection elements and actuators can be used to achieve the disclosed function. It is understood, therefore, that this invention is not limited to the particular embodiments disclosed, but it is intended to cover modifications within the spirit and scope of the present invention as defined by the appended claims.

I claim:

1. A system for translating, converting or transforming audio energy into at least one haptic and visual representation, comprising:
    a microphone that converts a plurality of physical sound waves into an output signal;
    a plurality of first filters that smooth frequencies of the output signal in an audible range;
    a second filter that attenuates frequencies of the output signal in the audible range above a predetermined frequency;
    a processor; and
    a memory operatively coupled to the processor and having computer readable instructions stored thereon which, when executed by the processor, causes the processor to:
        apply a moving window across a plurality of time intervals that comprise the output signal to measure a plurality of power values from the plurality of time intervals that comprise the output signal;
        calculate a minimum average power value and a maximum average power value across the plurality of time intervals;
        apply a linear compression and a non-linear compression that scale the output signal to a normalized range that falls within a one-byte range; and
        render a plurality of visual outputs and a haptic output in response to the normalized range.

2. The system of claim 1, wherein at least one the plurality of first filters allows all frequencies below a predetermined frequency to pass through it.

3. The system of claim 1, wherein the visual output is based on the minimum average power value and the maximum average power value.

4. The system of claim 1, wherein the haptic output and visual output is rendered in real-time.

5. The system of claim 1, further comprising a wearable device, wherein the microphone, the processor and the memory are housed in the wearable device.

6. A system, comprising:
    a non-transitory computer-readable medium having a computer-readable code stored thereon that, when executed by one or more computing devices, causes the one or more computing devices to:
    receive audio input through a microphone of a wearable device; and
    translate, convert or transform signals representing the received audio input to one or more visual representations or haptic representations produced by the wearable device by:
        applying a moving window across a plurality of time intervals of an output signal to render a plurality of root mean square average power values within the plurality of time intervals;
        calculate a minimum root mean square average power value and a maximum root mean square average power value across the plurality of time intervals that comprise an entire received audio input; and
        apply a digital linear compression above a predetermined threshold and a digital non-linear digital compression below the predetermined threshold that scale the plurality of root mean square average power values to a normalized digital range of a byte.

7. The system of claim 6, wherein the translating, converting or transforming includes processing the received audio input as at least one digital signal and applying a low pass filter to the at least one digital signal.

8. The system of claim 6, wherein the one or more representations comprise the haptic representations.

9. The system of claim 6, wherein the one or more representations comprise the visual representations.

10. The system of claim 6, wherein the one or more representations comprise the haptic representations and the visual representations.

11. An apparatus comprising:
    a microphone configured to receive audio input from a surrounding environment and render an electrical output signal;
    an output device; and
    a processor in communication with the microphone and the output device, the processor being configured to translate the audio input into one or more representations that are manifested by the output device to the surrounding environment by:

applying a moving window across a plurality of time intervals of the electrical output signal to measure an average power value within each time interval of the plurality of time intervals;

calculate a minimum average power value and a maximum average power value across the plurality of time intervals; and apply a linear digital compression when the average power value is above a predetermined threshold and a non-linear digital compression when an average power value is below the predetermined threshold to scale the average power value to a normalized digital range of an-eight bit range.

12. The apparatus of claim 11, wherein the output device comprises a motor including at least one of a haptic eccentric rotating mass motor, a linear haptic motor, and a piezo haptic motor.

13. The apparatus of claim 11, wherein the audio input is music received in the surrounding environment, and wherein the one or more representations are haptic representations of a music bassline.

14. The apparatus of claim 13, wherein the processor renders a haptic response through the output device and wherein the haptic response changes in intensity or frequency in response to changes in the received audio input.

15. The apparatus of claim 11, wherein the audio input comprises music received in the surrounding environment and the output device comprises a light emitting diode, and wherein the one or more representations comprise light representations of a music bassline.

16. The apparatus of claim 15, wherein the light representations change in color, frequency or intensity in response to changes in the received audio input.

17. An apparatus comprising:
a microphone configured to receive audio input;
an output device; and
a processor in communication with the microphone and a motor, the processor configured to process the received audio input and to direct rotational movement of a motor based on the processing that:
apply a moving window across a plurality of time intervals of the output signal to measure an average power value within each time interval of the plurality of time intervals of the received audio input;
calculate a first boundary based on a minimum average power value and a second boundary based on a maximum average power value measured across the plurality of time intervals; and
apply a linear digital compression above a predetermined threshold and a non-linear digital compression below the predetermined threshold that assign each average power value of the received audio input to a range within the first boundary and the second boundary; and
render a modulated output processed to generate a visual output and a haptic output in response to the assignment of each average power value within the range between the first boundary and the second boundary;
where the range between the first boundary and the second boundary is restricted to a one-byte range.

18. The apparatus of claim 17, where the apparatus is wearable by a user.

19. The apparatus of claim 17, where the output device comprises at least one of a haptic motor, an eccentric rotating mass motor, a linear haptic motor, and a piezo haptic motor.

20. The apparatus of claim 17, wherein the output device comprises a light emitting diode.

* * * * *